United States Patent
Strong

(10) Patent No.: US 6,377,016 B1
(45) Date of Patent: Apr. 23, 2002

(54) HANDLEBAR ACCELERATOR FOR AN ELECTRICAL BICYCLE

(76) Inventor: Samuel Y. T. Strong, No. 147, Kungyuan Rd., North Dist., Tainan (TW)

( * ) Notice: Subject to any disclaimer, the term of this patent is extended or adjusted under 35 U.S.C. 154(b) by 0 days.

(21) Appl. No.: 09/768,988

(22) Filed: Jan. 23, 2001

(51) Int. Cl.[7] .................... G05G 1/10; B62K 23/02
(52) U.S. Cl. .................. 318/653; 318/139; 318/549; 74/488
(58) Field of Search .................. 318/647, 652, 318/653, 549; 74/488, 489; 180/170, 177, 218

(56) References Cited

U.S. PATENT DOCUMENTS

| | | | | |
|---|---|---|---|---|
| 4,191,065 A | * | 3/1980 | Golobay et al. | 74/489 |
| 4,352,303 A | * | 10/1982 | Christner | 74/489 |
| 4,461,189 A | * | 7/1984 | Rottenkolber et al. | 74/489 |
| 4,607,733 A | * | 8/1986 | Dodge | 192/3 S |
| 6,276,230 B1 | * | 8/2001 | Crum et al. | 74/551.9 |
| 6,318,490 B1 | * | 11/2001 | Laning | 180/170 |

* cited by examiner

Primary Examiner—Bentsu Ro
(74) Attorney, Agent, or Firm—Kolisch Hartwell Dickinson McCormack & Heuser

(57) ABSTRACT

A handlebar accelerator for an electric bicycle has a bar, a tubular grip, and a joint. The grip has a ring formed at a first end thereof, a sector notch defined in the ring, and two magnetic elements respectively formed at two ends of the sector notch. The joint has a first hole defined at a first side for receiving one end of the grip, a second hole defamed at a second side for receiving one end of the bar, a channel defined therein for receiving the ring, a slot defined in the channel, a groove defined beside the channel, a passage in communication with the channel and the groove and extending outwards, and wires extending through the passage and electrically connected with a speed adjuster device. An examining element is secured in the slot and electrically connected with the wires.

4 Claims, 4 Drawing Sheets

HANDLEBAR ACCELERATOR FOR AN ELECTRICAL BICYCLE

BACKGROUND OF THE INVENTION

1. Field of the Invention

The present invention is related to a handlebar for an electrical bicycle, and more particularly to a handlebar accelerator used for adjusting the speed of a motor fitted to the bicycle.

2. Description of Related Art

Referring to FIG. 5, a conventional electrical bicycle has a driving device (50) and a speed adjuster device (60). The driving device (50) is composed of a battery (51), a motor driving circuit (52), a relay (53), and an electric motor (54). The speed adjuster device (60) has a processor (61), a driving circuit (62), a servo mechanism (63) and sensors (not shown or numbered). A handlebar accelerator (70) is provided at a handlebar at the head of the bicycle to change the speed of the electric motor (54) and thus the bicycle. The handlebar accelerator (70) has a rotatable sleeve, and an examining element (not shown or numbered) provided therein and electrically connected with the processor (61) by wires. The handlebar accelerator (70) further includes a plurality of fixed magnetic members (not shown or numbered). When the sleeve is turned relative to the fixed magnetic members, the examining element registers the change between the sleeve and the magnetic members, and sends a signal to the speed adjuster device (60) which then changes the speed of the electric motor (54).

However, the wires will become stretched by the handlebar accelerator (70) because they are moved when the handlebars are moved. After such stretching over a period of time, the wires have a serious risk of being disengaged from the examining element, and even broken.

Therefore, the invention provides a handlebar accelerator for an electrical bicycle to mitigate and/or obviate the aforementioned problem.

SUMMARY OF THE INVENTION

The main objective of the present invention is to provide a handlebar accelerator for an electrical bicycle which can prevent wires from being disengaged from an examining element, or even broken.

Other objects, advantages and novel features of the invention will become more apparent from the following detailed description when taken in conjunction with the accompanying drawings.

DETAILED DESCRIPTION OF THE PREFERRED EMBODIMENT

Figure 1:
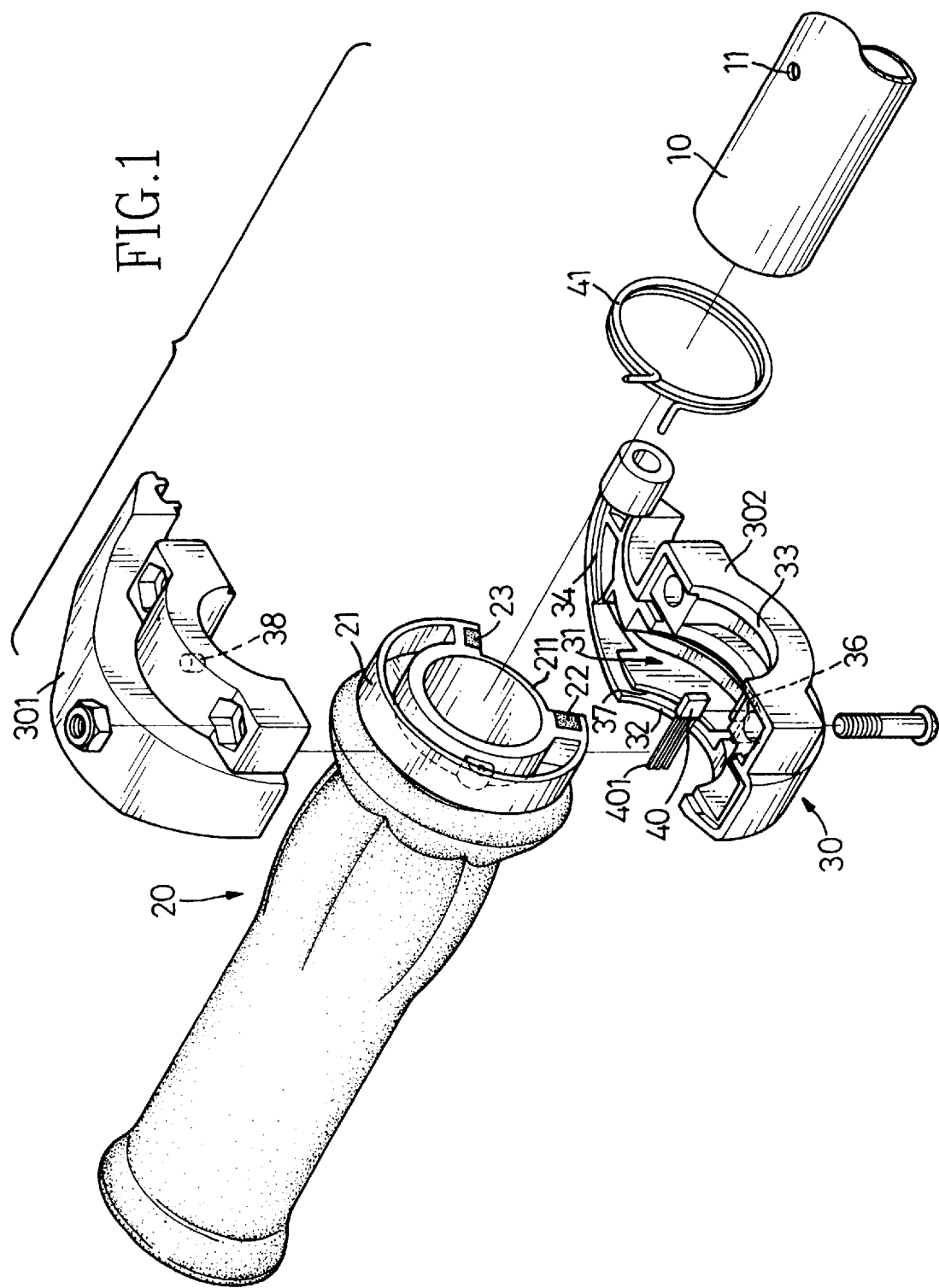
FIG. 1 is an exploded perspective view of a handlebar accelerator for an electrical bicycle in accordance with the present invention.
Figures 2, 3:
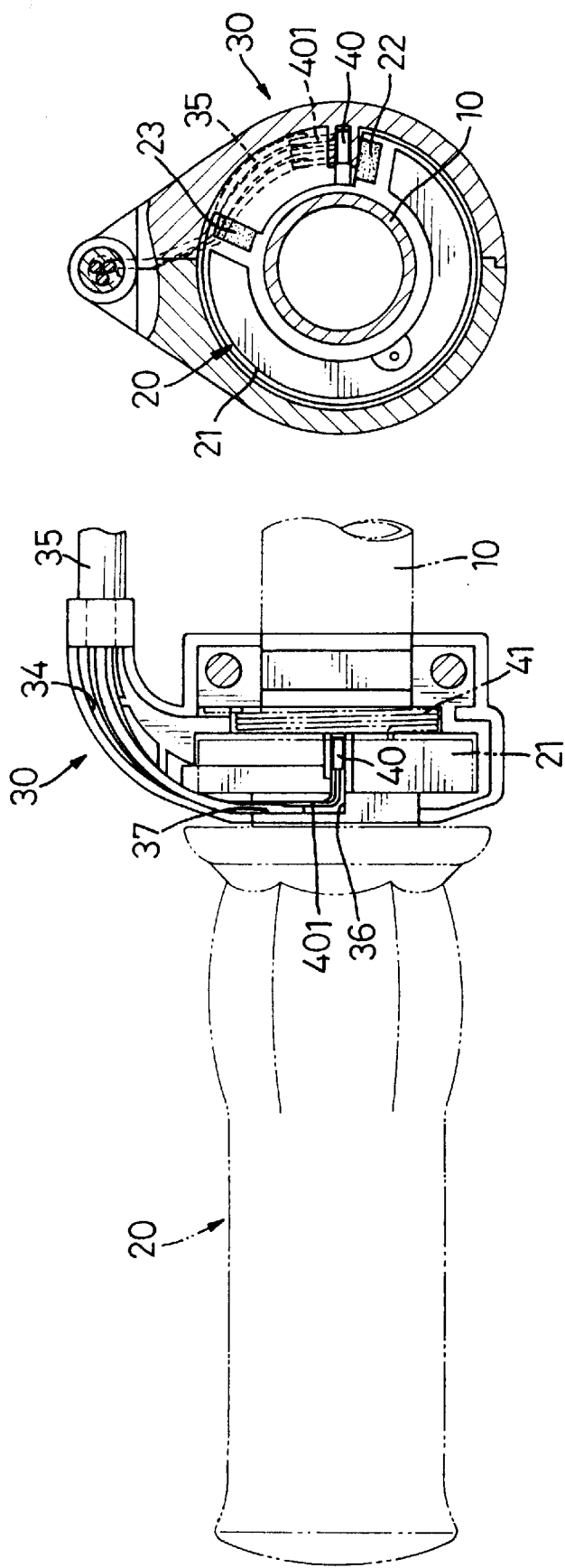
FIG. 2 is a side sectional view of the handlebar accelerator in FIG. 1.
FIG. 3 is a cross sectional view of the handlebar accelerator in FIG. 1.

Referring to FIGS. 1–3, a handlebar accelerator for an electrical bicycle in accordance with the invention is composed of a bar (10), a tubular grip (20), and a joint (30) by which the grip (20) is rotatably mounted on the bar (10).

The grip (20) has a ring (21) shaped as a "C" and formed at a first end thereof. The ring (21) has a sector notch (211) defined therein and two magnetic members (22, 23) are respectively formed at two ends of the notch (211).

The joint (30) is composed of an upper semi-joint (301) and a lower semi-joint (302) engaged together by a screw and a nut. A channel (31) is internally defined in the joint (30) for receiving the ring (21). A first hole (32) is defamed at a first side of the joint (30) for the first end of the grip (20) to extend therein, and a second hole (33) is defined at a second side of the joint (30) for one end of the bar (10) to extend therein. A passage (34) extends between the channel (31) and an outlet of the joint (30). An examining element (40) is provided in the joint (30), and wires (35) leading from a speed adjuster device (not shown) extend through the passage (34) to electrically connect with the examining element (40). A slot (36) is defined in the channel (31) for securing in place the examining element (40). A groove (37) is defined beside the channel (31), and in communication with the slot (36) and the passage (34). Legs (401) of the examining element (40) are bent such that free ends thereof can be received in the groove (37). The wires (35) extend in the groove (37) to electrically connect with the legs (401). Connecting points between the wires (35) and the legs (401) are securely located in the groove (37).

Moreover, a torsion spring (41) is provided in the joint (30) with a first end fixed in the channel (31) and a second end fixed in the ring (21). By the torsion spring (41), the grip (20) can automatically return to an original position after having been rotated relative to the joint (30) and then released.

Furthermore, a pin (38) is formed on an inner wall of the second hole (33) and inserted in an aperture (11) defined at a periphery of the bar (10) to fasten the joint (30) on the bar (10).

Figure 4:
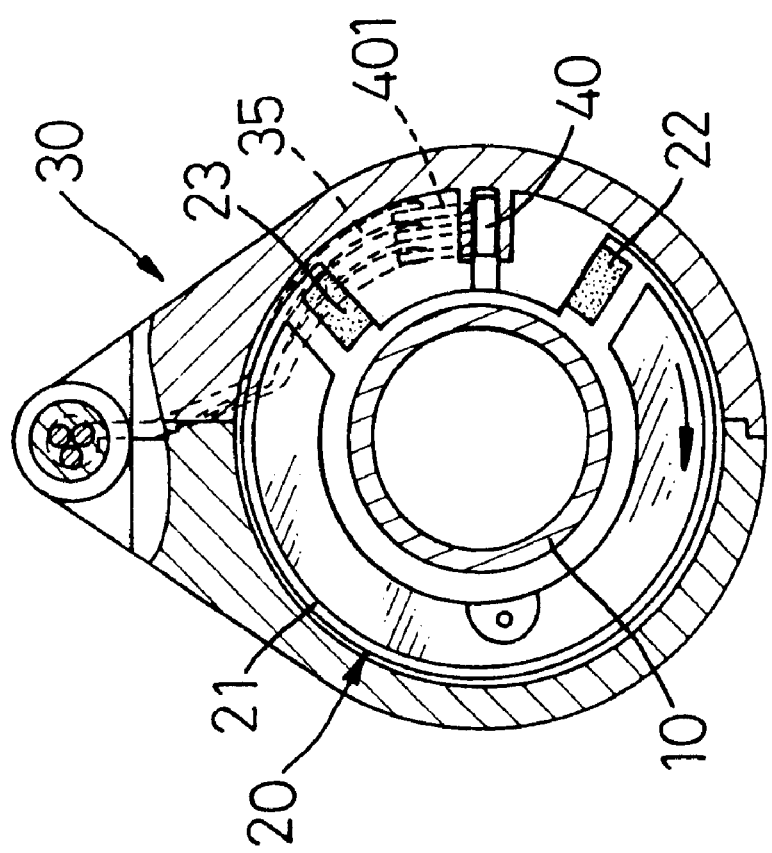
FIG. 4 is a side sectional view showing that the handlebar accelerator is turned to adjust a speed of the bicycle.
Figure 5:
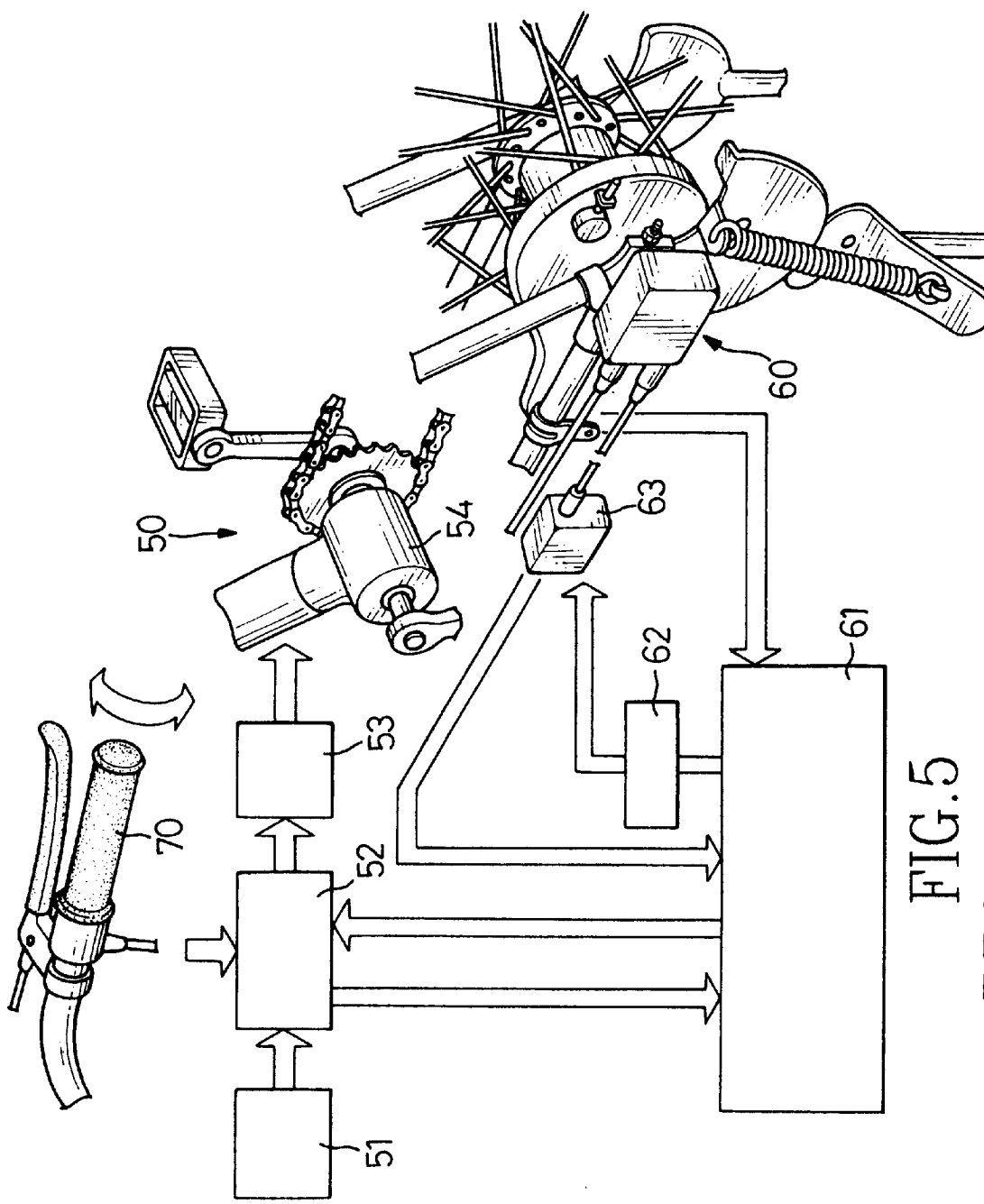
FIG. 5 is a schematic view of a conventional electrical bicycle.

Referring to FIGS. 3 and 4, to change a speed of an electric motor fitted to the electric bicycle, the rider turns the grip (20) whereby the magnetic members (22, 23) are moved with respect to the examining element (40) which will then detect the movement and send a signal to the speed adjuster device to change the speed of the electric motor, and thus the speed of the electric bicycle.

Because the examining element (40) and the wires (35) are fixed in the joint (30) and the grip (21) will not stretch the wires (35), the wires (35) cannot be broken. Furthermore, the connecting points between the wires (35) and legs (401) are securely located within the groove (37) to provide a fine electrical connecting effect.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A handlebar accelerator for an electric bicycle, wherein the electric bicycle includes an electric motor, a battery, a circuit between the motor and the battery, a speed adjuster device, and wires extending from the circuit, the improvements comprising:

a bar (10);

a grip (20) having a ring (21) formed at a first end thereof, a sector notch (211) defined in the ring (21), and two magnetic elements (22, 23) respectively formed at two ends of the sector notch (211);

a joint (30) being composed of an upper semi-joint (301) and a lower semi-joint (302), the joint (30) having a first hole (32) defined at a first side for receiving the first end of the grip (20), a second hole (33) defined at a second side for receiving one end of the bar (10), a channel (31) defined therein for receiving the ring (21), a slot (36) defined in the channel (31), a groove (37) defined beside the channel (31), a passage (34) in communication with the channel (31) and the groove (37) and extending outwards, and the wires extending from the passage (34) and electrically connected with the speed adjuster device; and an examining element (40) secured in the slot (36) and electrically connected with the wires;

whereby, when the grip is turned, the examining element will detect a movement of the magnetic elements (22, 23) and send a signal to the speed adjuster device to change the speed of the electric motor.

2. The handlebar accelerator for an electric bicycle as claimed in claim 1, wherein the examining element (40) further comprises legs (401) bent to extend in the groove (37) and electrically connected with the wires (35) respectively.

3. The handlebar accelerator for an electric bicycle as claimed in claim 1, wherein the second hole (33) further comprises a pin (38) formed at an inner wall thereof to engage in an aperture (11) defined in the bar (10), whereby the joint is non-rotatably secured with the bar (10).

4. The handlebar accelerator for an electric bicycle as claimed in claim 1, wherein a torsion spring is mounted between the joint and the grip, the torsion spring having a first end secured to the joint and a second end secured to the grip, whereby the grip automatically returns to an original position after the grip has been rotated away from the original position and then released.

\* \* \* \* \*